United States Patent [19]

Hensel et al.

[11] 4,036,419
[45] July 19, 1977

[54] SEVERING APPARATUS

[75] Inventors: Paul Christopher Hensel, Woodbridge; Ronald Geoffrey Spiers, N. Wembley, both of England

[73] Assignee: The Post Office, London, England

[21] Appl. No.: 703,187

[22] Filed: July 7, 1976

[30] Foreign Application Priority Data

July 14, 1975 United Kingdom ............... 29511/75

[51] Int. Cl.² .............................................. B26F 3/00
[52] U.S. Cl. .................................. 225/96.5; 225/101; 225/105; 65/DIG. 7; 83/6
[58] Field of Search ................ 225/96.5, 96, 101, 103, 225/105; 65/87, 174, 176, DIG. 7; 83/6

[56] References Cited

U.S. PATENT DOCUMENTS 3,934,773  1/1976  Chinnock et al. ............... 225/96.5 X Primary Examiner—J. M. Meister
Attorney, Agent, or Firm—Kemon & Estabrook

[57] ABSTRACT

A device for severing a dielectric optical waveguide comprising at least one dielectric optical waveguide clamping means for holding a portion of said dielectric optical waveguide against an anvil means, means for applying a constant force to said anvil means independent of displacement of said anvil means so that a preset tension is applied to said dielectirc optical waveguide, and knife means for engaging said dielectric optical waveguide and initiating a fracture through said dielectric optical waveguide.

11 Claims, 8 Drawing Figures

SEVERING APPARATUS

The present invention relates to improvements in dielectric optical waveguide severing apparatus.

With improvements in the production of low loss dielectric optical waveguides, it is becoming increasingly feasible to use dielectric optical waveguides for telecommunications puposes. The use of dielectric optical waveguides in this way will necessitate the development of jointing techniques. In order to produce a low loss dielectric optical waveguide joint it is necessary to cut or sever dielectric optical waveguides so that the end of the dielectric optical waveguide is smooth and orientated at 90° to the dielectric optical waveguide axis. At first sight this may seem an easy task. However it should be remembered that dielectric optical waveguides for use in telecommunications systems are made of glass and have overall diameters of the order of 100 microns or less. Furthermore any device used for severing dielectric optical waveguides under field conditions must be simple and easy to use.

Apparatus for severing dielectric optical waveguides is described in "Optical Fibre End Preparation for Low-Loss Splices" by D. Gloge et al, in the Bell System Technical Journal Volume 52 page 1579 et seq, November 1973. The device described in this article operates by bending and tensioning the dielectric optical waveguide to be severed and scribing the bent surface. This causes a fracture to propagate through the dielectric optical waveguide and produces and end surface substantially at 90° to the axis of the dielectric optical waveguide, which is smooth. This enables suitable low loss dielectric optical waveguide joints to be made. The apparatus described however is somewhat cumbersome and requires the operator to correctly adjust the tension applied to the dielectric optical waveguide.

The present invention seeks to provide an improved form of dielectric optical waveguide severing apparatus, which is compact and can be used by a comparatively unskilled operator. The only operations required by the apparatus of the present invention, are:
1. clamping the dielectric optical waveguide into the severing apparatus,
2. releasing a tensioning device,
3. releasing a knife mechanism, and
4. in certain circumstances operating a scribing mechanism.

The operator does not need to adjust the tension applied to the dielectric optical waveguide, as this is automatically carried out by the device.

According to the present invention there is provided a device for severing a dielectric optical waveguide comprising at least one dielectric optical waveguide clamping means for holding a portion of said dielectric optical waveguide against an anvil means, means for applying a constant force to said anvil means independent of displacement of said anvil means so that a preset tension is applied to said dielectric optical waveguide, and knife means for engaging said dielectric optical waveguide and initiating a fracture through said dielectric optical waveguide.

Said device may include in addition to said one dielectric optical waveguide clamping means, a second dielectric optical waveguide clamping means for holding a portion of said dielectric optical waveguide against movement of said anvil means.

Preferably said anvil means is convexly curved so that said dielectric optical waveguide is bent.

The term force as herein used is to be understood as referring to force is a generalised sense, and in particular includes within its ambit torque.

An embodiment of the invention will now be described by way of example with reference to the accompanying drawings in which.

Figure 1:
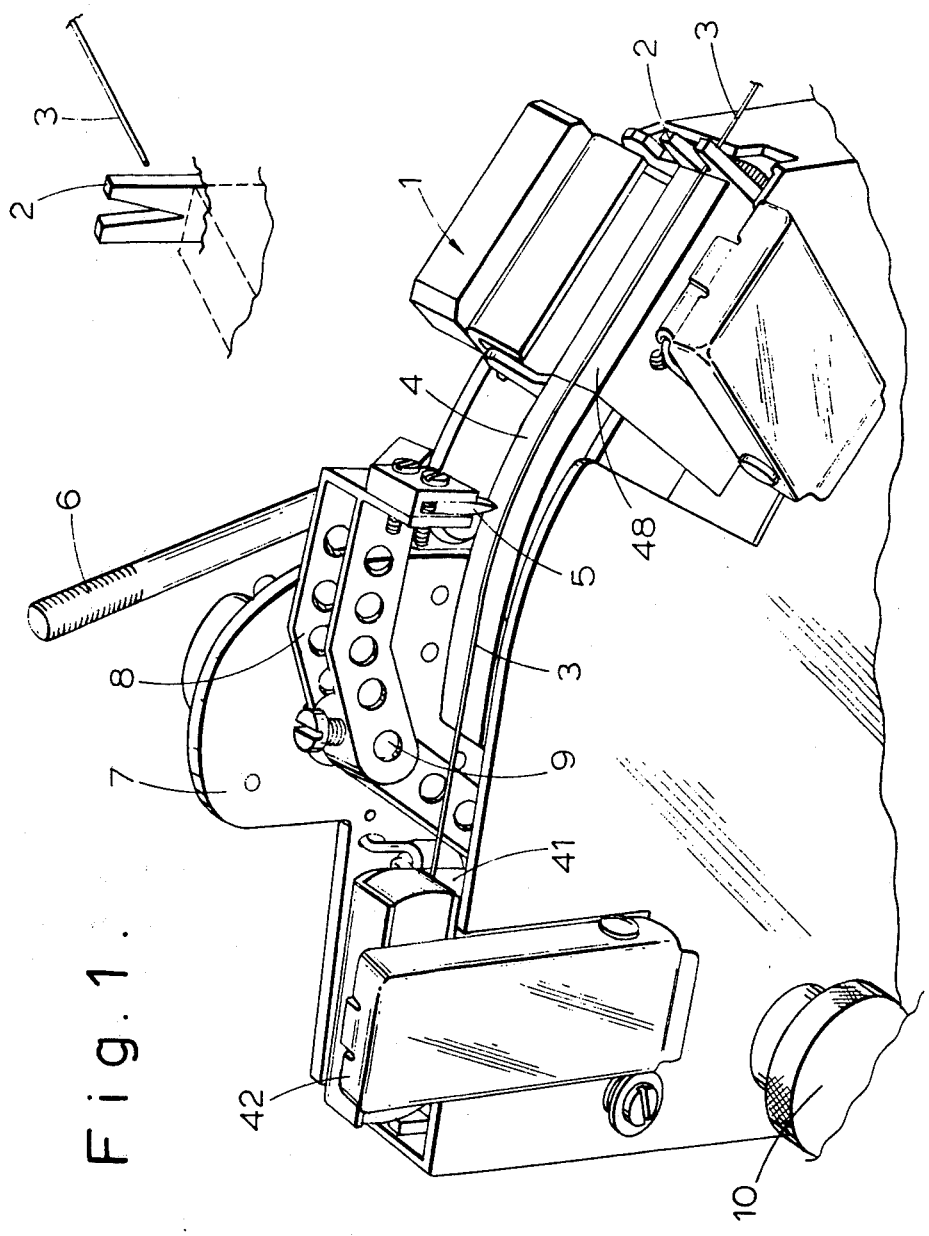
FIG. 1 shows a perspective view of a portion of a dielectric optical waveguide severing device according to the present invention.
Figure 2:
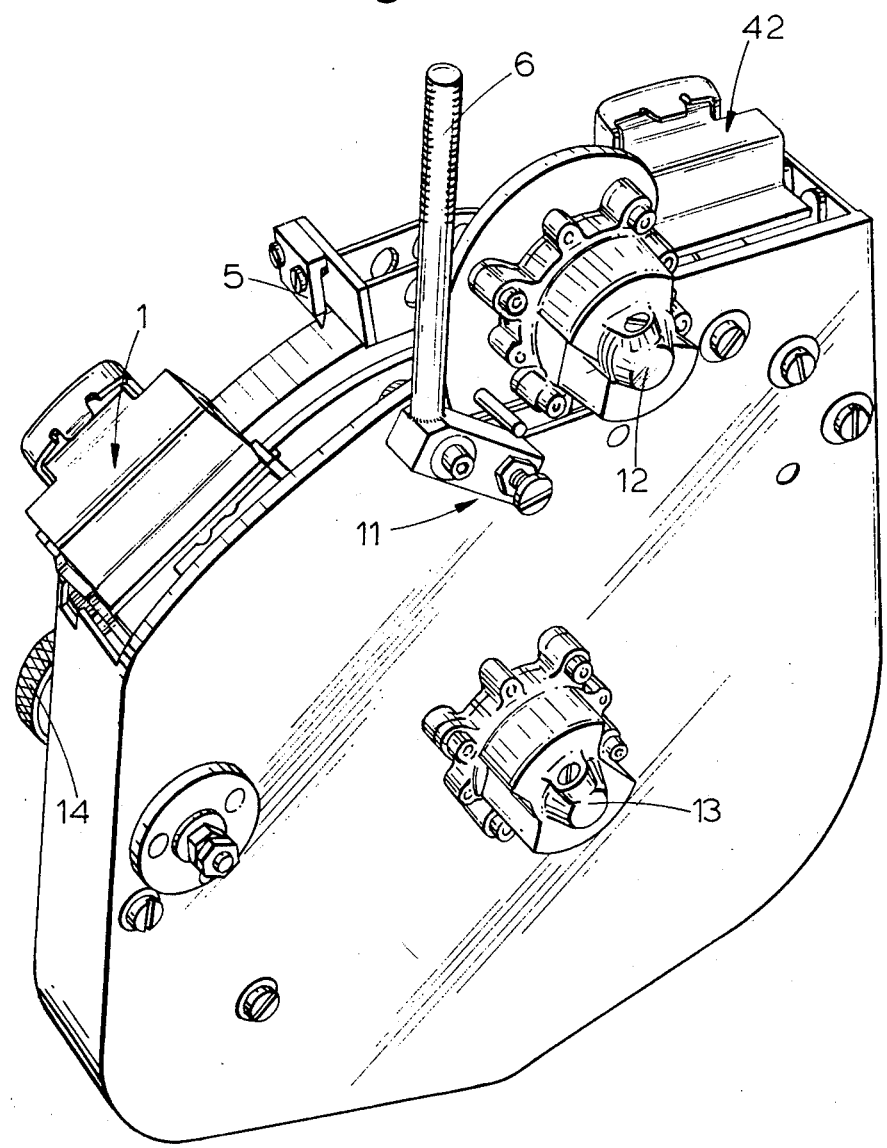
FIG. 2 shows a second perspective view of the device illustrated in FIG. 1.
Figure 3:
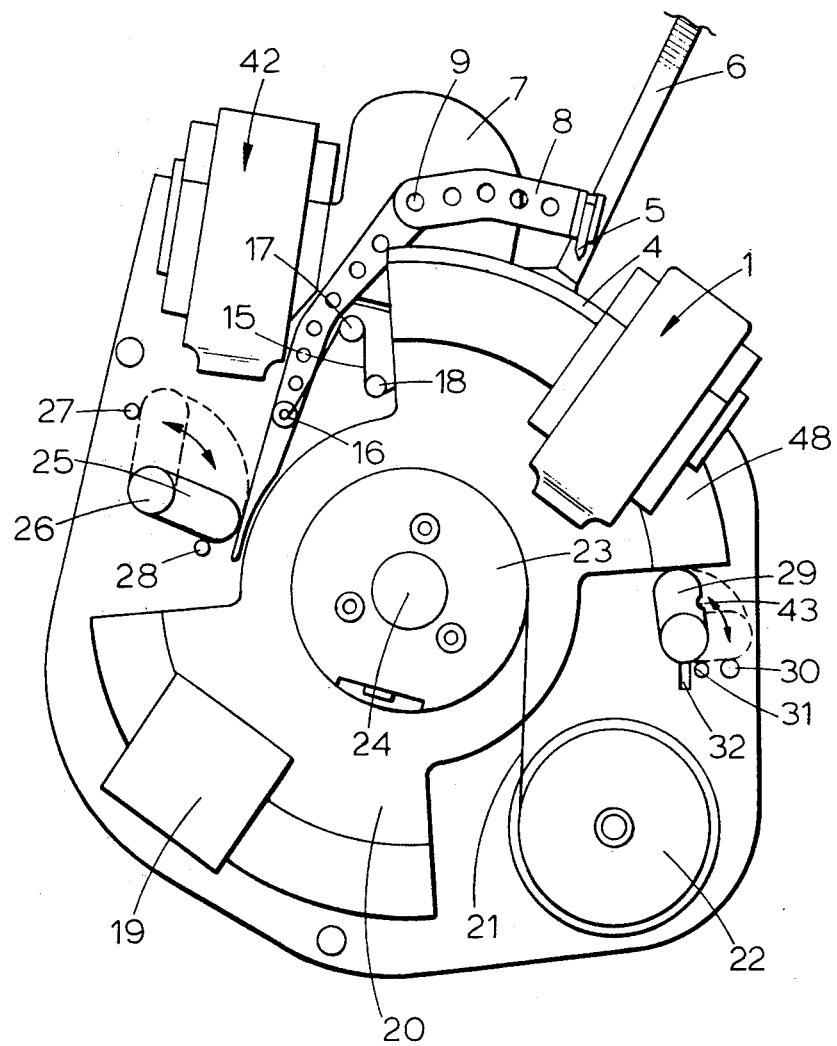
FIG. 3 shows a cut-away section of the device shown in FIG. 1 illustrating the operating mechanism.

Referring now to FIGS. 1, 2 and 3, the device consists of a pair of clamps 1 and 42 for holding a dielectric optical waveguide 3 against a curved anvil 4, and a knife edge 5 which can be brought into contact with the dielectric optical waveguide. The dielectric optical waveguide to be broken is held by clamp 42 against a fixed block 41 and positioned laterally by means of a V groove. The dielectric optical waveguide then passes over anvil 4 and is clamped against the anvil by means of the other clamp 1, the dielectric optical waveguide is again positioned laterally be means of V groove 2.

The anvil 4 is formed as part of a Dural block 20 pivotally mounted at 24. The clamp 1 is attached to this block. The block is also provided with a counter weight 19, see FIG. 3, so that its centre of gravity coincides with its axis of rotation. The anvil block 20 is free to rotate under the action of a spring motor, against a dash pot 13, see FIG. 2. The spring motor consists of a first storage drum 23 and a second storage drum 22 together with a Tensator spring 21, which is a spring device sold by Tensator Limited under the trade mark 'TENSATOR'. Spring motors of this type are available from Roberts and Armstrong Engineers Limited of North Wembley, Middlesex, England. The spring motor has the characteristic that it applies a constant torque to the anvil member regardless of the displacement of the anvil member under the action of that torque.

In use the anvil member is held in a first position by means of a cam member 29 actuated by means of a knob 14.

In this first position a fibre to be severed is fastened into the device as previously described. Knob 14 is then rotated rotating the cam 29 until it contacts stop 30. This releases the anvil carrying member 20, which then rotates under the action of the constant torque of the spring motor and the resistive torque of the dash pot 13. The anvil thus moves until any slack in the dielectric optical waveguide is taken up. The torque acting on the anvil carrying member 20 is independent of the displacement of the anvil carrying member, being determined by the characteristics of the spring motor alone. It is thus apparent that when cam 29 is released the anvil carrying member 20 rotates until stopped by the clamped dielectric optical waveguide, and the dielectric optical waveguide is then placed under a tension determined solely by the setting of the spring motor. The operator of the machine therefore does not have to make any adjustment for tension. As can be clearly seen from FIG. 3 cam 29 has two positions, in the first position it is held by means of extension rod 32 and stop pin 31, and in the second position notch 43 engages pin 30.

The knife blade 5 is mounted on an arm 8 attached to a pivot 9 which is in turn connected to a dash pot 12. The knife blade is biased against the anvil by means of a wire spring 15 held against a pin 16 mounted on arm 8 and wound around a fixed pin 17 and acting against a second fixed pin 18. On rotation of knob 10, cam 25 rotates about pivot 26 to release the knife arm 8. The knife blade 5 then falls slowly under the action of the dash pot 12 until it is in contact with the top of the dielectric optical waveguide held in and tensioned by the device. If the knife blade were allowed to fall too rapidly the dielectric optical waveguide would not fracture cleanly. Cam 25 has two positions determined by means of stop pins 28 and 27. In the first position shown in hard line the cam retains blade 5 in a position clear of the anvil 4. In the second position shown in dotted line, cam 25 permits the knife blade to move towards the anvil 4 under the action of spring 15 and dash pot 12.

Figure 4:
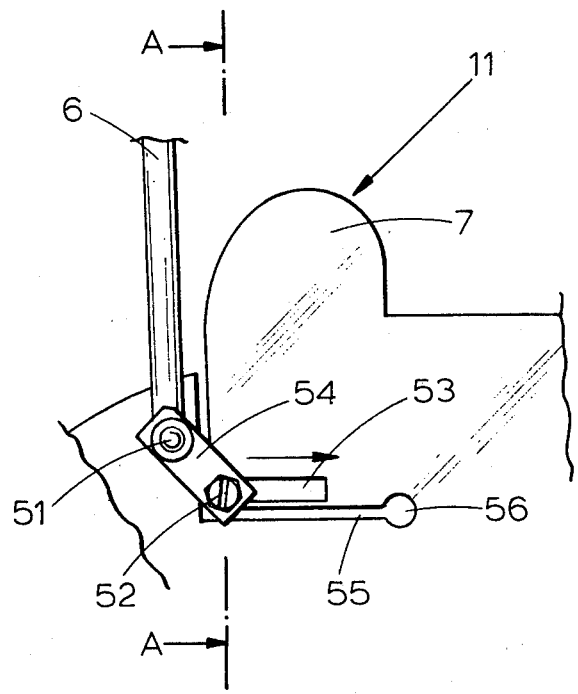
FIG. 4 shows the scribing mechanism employed in the device shown in FIG. 1.
Figure 5:
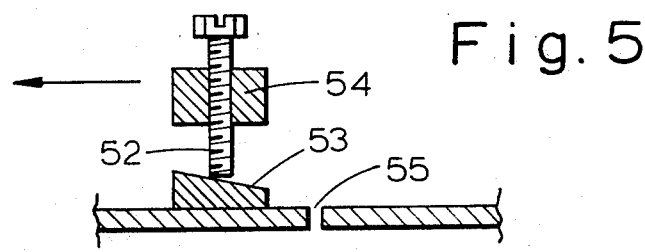
FIG. 5 shows a section along line AA of FIG. 4.

An arrangement, controlled by lever 6, is provided for moving the knife blade 5 backward and forward at 90° to the axis of a fibre mounted in the apparatus. This mechanism is shown in detail in FIGS. 4 and 5. The knife blade pivot 9 is attached to a plate 7, forming part of the outer cover of the fibre breaking device. This plate 7 has a slot 55 ending in a stress relieving hole 56, dividing it from the bulk of the face plate. This enables plate 7 to bend backwards and forwards comparatively easily. Mounted on plate 7 is a wedge 53. Lever 6, is pivotally mounted at 51 to the face plate of the apparatus. A block 54 carrying a screw 52 is rigidly attached to lever 6. The screw 52 bears on the camming wedge 53. Thus as lever 6 is operated to pivot about pivot point 51 and screw 52 is driven up wedge 53 causing plate 7 to deflect. Since the blade arm 8 is pivotally mounted to plate 7 the whole blade mechanism is moved backward and forward at an angle of substantially 90° to the axis of a dielectric optical waveguide mounted in the apparatus.

Figure 6:
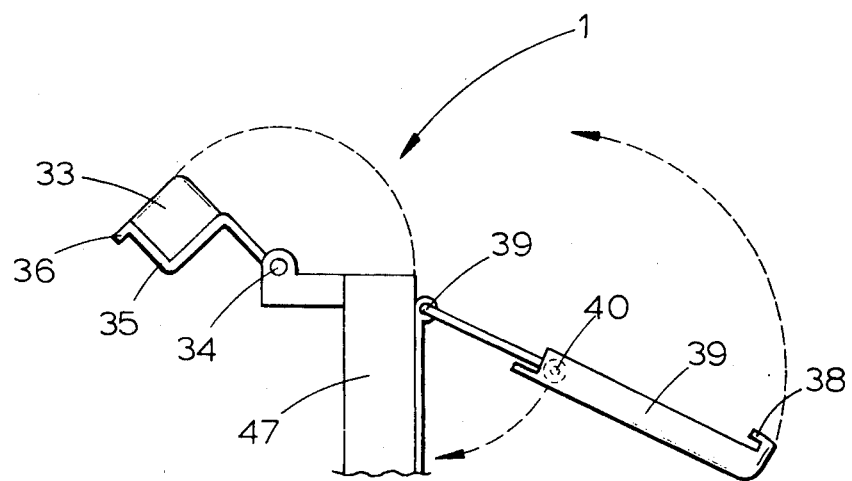
FIG. 6 shows the dielectric optical waveguide clamping mechanism used in the device shown in FIG. 1 in the open position.
Figure 7:
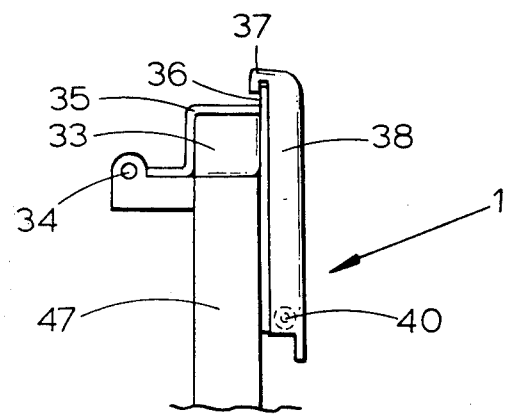
FIG. 7 shows the dielectric optical waveguide clamping device shown in FIG. 6 in the closed position.

The clamps used for retaining the dielectric optical waveguide, i.e. clamps 1 and clamps 42, are illustrated in FIG. 6 and FIG. 7. They consist of a rubber pad 33 held by a metal member 35 having an upstanding ledge 36. The metal member 35 is pivotally mounted at 34. In order to clamp a fibre, it is placed on the surface of block 47 and the member 35 is swung over so that the fibre is pressed between the top surface of block 47 and the rubber pad 33. A catch member 37 pivotally mounted at 40 to a wire frame which is in turn pivotally mounted to block 47 at 39 is then swung over so that the lip 38 engages ledge 36. This holds the clamp in the closed position as shown in FIG. 7. Clamps of this type are well-known so no further description will be provided.

As can be seen from FIGS. 1 and 2 the operative mechanism of the dielectric optical waveguide severing device is enclosed in a steel container. The only controls which require to be used by a operator are the clamps 1 and 42, anvil releasing knob 14, knife releasing knob 10, and scribing lever 6. In use a dielectric optical waveguide to be severed (i.e. separated or divided by a break) is positioned as shown in FIG. 1 across the top of anvil 4 and clamped by means of clamps 42 and 1, with the anvil in a position in which clamp 1 is at its closest to clamp 42. Knob 14 is then turned to release the anvil mechanism which then moves freely until the slack in the fibre is taken up. In this position the dielectric optical waveguide is bent and under a pre-set tension determined by the characteristics of the spring motor referred to previously. The anvil is curved to modify the stress distribution across the fibre so that when the break occurs a substantially flat orthogonal face is formed at the severed ends of the fibre. Knife releasing knob 10 is then rotated and the knife falls under the action of a force which is again completely determined by the apparatus. When it touches the dielectric optical waveguide the force it exerts may be sufficient to cause a clean break across the dielectric optical waveguide. If this does not occur then operation of lever 6 causes the knife to exert a scribing action which will initiate severing of the fibre to provide mirror-finish fibre ends. The knife may be counter balanced by means of a counterweight (not shown) so that the pre-set action of the knife is substantially independent of the orientation of the device.

In practice the clamp 1 may be dispensed with when the device is used in conjunction with a cable or other apparatus to which a dielectric waveguide is rigidly attached.

In these circumstances the dielectric optical waveguide severing device is fixed up against whatever it is that holds the dielectric optical waveguide and the dielectric optical waveguide need only be clamped by clamp 1. It will be appreciated that the device may be loaded in either direction and that only a small length of fibre need be wasted to provide a suitable end face for a dielectric optical waveguide joint.

Figure 8:
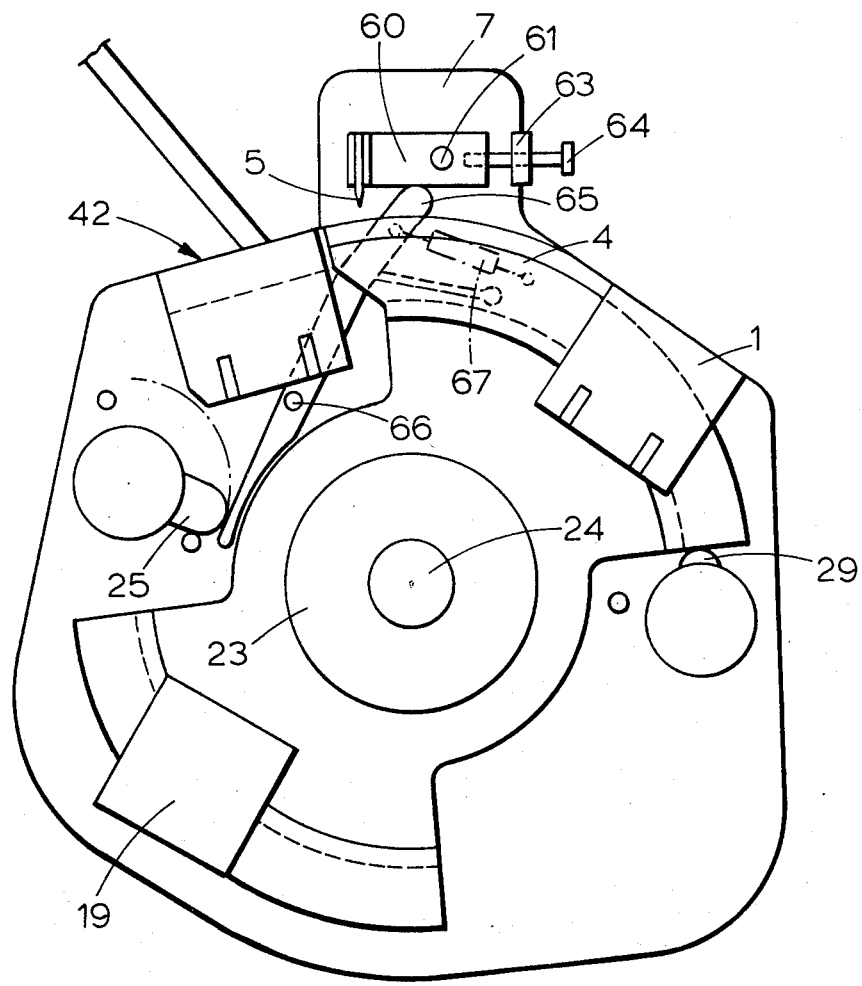
FIG. 8 shows a modified form of dielectric optical waveguide severing device.

In the modified dielectric optical waveguide severing device shown in FIG. 8, like parts are given the same reference numerals as in the previous Figures. The knife 5 has been turned around with respect to the anvil 4 so that the fibre break occurs close to clamp 42. In addition, the knife mechanism itself has been modified, istead of the knife 5 being biassed towards the anvil 4 by means of a spring, it is gravity biassed. The knife 5 is attached to a pivoted arm 60 pivoted about a pivot 61. The pivot is mounted in the supporting plate 7 as described with reference to the previous embodiment. The pivoted arm carries a weight 63, whose position is adjustable on screw 64. This enables the bias on the knife blade to be adjusted. The knife blade is held in the raised position by means of lever 65 pivoting about a pivot 66, which, in turn, is controlled by means of cam 25. A return action on lever 65 is provided by means of spring 67.

The only advantage gained in this embodiment is that the pressure exerted by knife 5 on the fibre is readily controllable. The remainder of the device is as previously described. cm What we claim is:

1. A device for severing a dielectric optical waveguide comprising at least one dielectric optical waveguide clamping means for holding a portion of said dielectric optical waveguide against an anvil means, means for applying a constant force to said anvil means independent of displacement of said anvil means so that a pre-set tension is applied to said dielectric optical waveguide, and knife means for engaging said dielectric optical waveguide and initiating a fracture through said dielectric optical waveguide.

2. A device according to claim 1 wherein said anvil means has a curved surface so that when said portion of said dielectric optical waveguide is held against said anvil means, said portion of said dielectric optical waveguide is bent, said curved surface curved in a plane normal to an axis of rotation about which said anvil means may rotate.

3. A device according to claim 2 wherein said means for applying a constant force comprises a spring motor containing a tensator which applies a constant torque about said axis of rotation, to said anvil means, and where in said anvil means is mechanically linked to a dash pot.

4. A device according to claim 3 wherein said anvil means can be held in a first position, released to move to a second position, and returned from said second position to said first position by a cam.

5. A device according to claim 4 wherein said anvil means is pivotally mounted on a support means so that said anvil means has a centre of gravity which lies on said axis of rotation.

6. A device according to claim 1 wherein said means for holding is a first clamp mounted on said anvil means and a second clamp mounted on said support means.

7. A device according to claim 1 wherein said knife means comprises a blade for scribing said portion of said dielectric optical waveguide on said anvil means, said blade biassed toward said portion of said dielectric optical waveguide and mechanically connected to a dash pot.

8. A device as claimed in claim 7 wherein said blade is attached to a pivoted arm which is spring biassed about a pivot.

9. A device as claimed in claim 7 wherein said blade is attached to a pivot arm which is gravity biassed by an adjustable weight about a pivot.

10. A device as claimed in claim 9 wherein there is provided means for imparting a translatory movement to said blade in a direction normal to the axis of said portion of said dielectric optical waveguide.

11. A device as claimed in claim 9 wherein said blade pivot is attached to a first section of a support plate, separated from a second section of said support plate by a slot, said first and second sections of plate joined by a narrow region of plate, a wedge attached to one of said first and second sections of plate and a pivoted lever mounted on the other of said first and second sections of plate, said pivoted lever having a wedge engaging surface so that movement of said lever deflects said first plate with respect to said second plate.

* * * * *